(12) United States Patent
Kennedy

(10) Patent No.: US 9,281,669 B2
(45) Date of Patent: Mar. 8, 2016

(54) CORD MANAGMENT SYSTEM

(71) Applicant: Rye James Kennedy, Leon, KS (US)

(72) Inventor: Rye James Kennedy, Leon, KS (US)

(*) Notice: Subject to any disclaimer, the term of this patent is extended or adjusted under 35 U.S.C. 154(b) by 211 days.

(21) Appl. No.: 14/072,617

(22) Filed: Nov. 5, 2013

(65) Prior Publication Data

US 2014/0124239 A1 May 8, 2014

Related U.S. Application Data

(60) Provisional application No. 61/723,295, filed on Nov. 6, 2012.

(51) Int. Cl.
*H02G 3/04* (2006.01)

(52) U.S. Cl.
CPC ......... *H02G 3/0462* (2013.01); *Y10T 29/49959* (2015.01)

(58) Field of Classification Search
CPC . H04R 1/1033; H02G 3/0462; H02G 3/0468; H02G 3/0481; H01B 17/58
USPC .................................... 174/135, 69
See application file for complete search history.

(56) References Cited

U.S. PATENT DOCUMENTS

| | | | | | |
|---|---|---|---|---|---|
| 3,068,316 | A | * | 12/1962 | Witt | 174/135 |
| 4,754,531 | A | * | 7/1988 | Skyba | 24/300 |
| 7,202,414 | B2 | * | 4/2007 | Johnson | 174/36 |
| 7,219,397 | B2 | * | 5/2007 | Bishop | 24/115 R |
| 7,622,670 | B1 | * | 11/2009 | Sanderson et al. | 174/36 |
| 8,133,241 | B2 | * | 3/2012 | Boyd et al. | 606/151 |
| 8,269,110 | B2 | * | 9/2012 | Scifo et al. | 174/135 |
| 8,269,111 | B2 | * | 9/2012 | Scifo et al. | 174/135 |
| 8,383,941 | B2 | * | 2/2013 | Goodman | 174/68.3 |
| 8,848,965 | B2 | * | 9/2014 | Glaser | 381/374 |
| 2011/0110552 | A1 | * | 5/2011 | Pang et al. | 381/374 |
| 2011/0290532 | A1 | * | 12/2011 | Cano, Jr. | H04R 1/1033 174/135 |
| 2012/0170790 | A1 | * | 7/2012 | Pang et al. | 381/384 |
| 2014/0020928 | A1 | * | 1/2014 | Johnson | B65H 75/362 174/110 R |
| 2014/0339349 | A1 | * | 11/2014 | Johnson | 242/118.3 |

* cited by examiner

Primary Examiner — Joshua Kennedy

(57) ABSTRACT

A cord management system that stores and protects cords in an untangled state while the cord is not in use by the user. In some embodiments, the cord management system may include a stationary clasp, a slidable clasp, and a flexible body member that stretches over a user's cord and subsequently encapsulates the cord for storage upon the cavity's relaxation. The cord management system may provide the user with a quick and convenient, two-handed single motion, means to store and protect their cords and prevents the cord from becoming entangled. The cord management system can be an after-market product and retrofitted to a user's pre-existing cords or can be an integral design of cord. The cord management system resides at the end of the cord in a compressed manner that allows the full functionality of the cord without causing unwanted/unsupported weight on the cord.

19 Claims, 9 Drawing Sheets

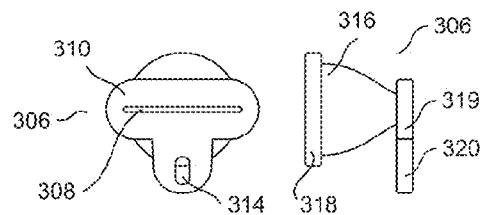
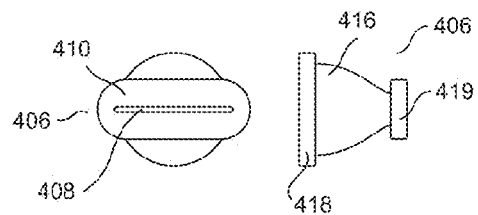
FIG. 3    FIG. 4
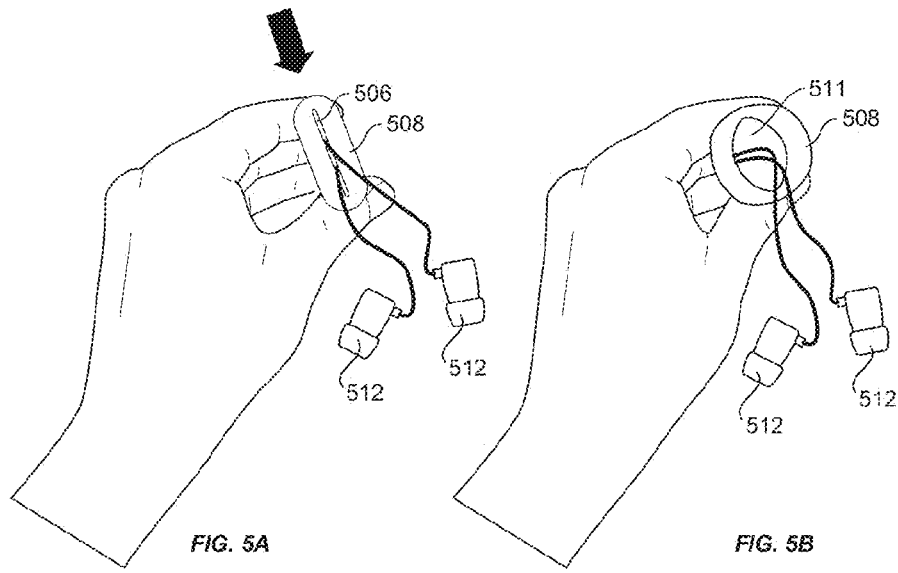
FIG. 5A    FIG. 5B
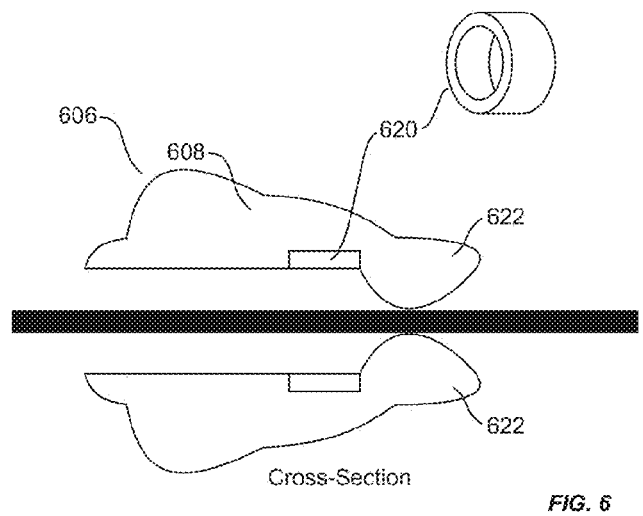
FIG. 6

*FIG. 16*

| Decoupling the slidable clasp from the second end portion of the cord; | — 1602 |

| Moving the slidable clasp towards the first end portion of the cord, thereby retracting the flexible body member such that said cord is expanded to its elongated state; | — 1604 |

| Coupling the slidable clasp to the first end portion of the cord thereby compressing the flexible body member to a compressed state; | — 1606 |

CORD MANAGMENT SYSTEM

CROSS-REFERENCE TO RELATED APPLICATIONS

This application claims the benefit of Provisional Application No. 61/723,295, filed on Nov. 6, 2012, which is incorporated by reference in its entirety.

BACKGROUND

Conventional portable cords, such as wired headphones, wired earbuds, or accessory cords to portable electronics tend to become entangled and knotted when not in use. The user of the portable cord must then untangle the nested cords upon retrieval from the stored location such as hand bags, backpacks, gym bags, trouser pockets and the like. The process of untangling the cords can become time consuming and annoying to the user. Beyond the annoyance of untangling cords, there are other considerations such as protecting the cords from becoming damaged by frequent entanglement. In addition, with respect to some portable cords such as multimeter test leads, it may be necessary to store the cords in a manner that they cannot become nicked or cut by other tools in a user's tool bag.

SUMMARY

The details of one or more implementations are set forth in the accompanying drawings and the description below. Other features will be apparent from the description and drawings, and from the claims.

Embodiments provide an apparatus for managing a cord. The apparatus may include a flexible body member, a stationary clasp, and a slidable clasp. The flexible body member may include a cavity extending along a length of the flexible body member. The flexible body member may be configured to receive and protect a cord within the cavity, and expand from a retracted position to an expanded position, where the flexible body member may be biased towards the retracted position. The stationary clasp may be disposed proximate to a first end portion of the flexible body member, and the stationary clasp may be configured to be coupled to a first end portion of cord. The slidable clasp may be disposed proximate to a second end portion of the flexible body, and configured to move the flexible body member between the retracted position and the expanded position. The slidable clasp may be configured to be coupled to a second end portion of the cord. When coupled to the second end portion cord, the slidable clasp may be configured to the move the flexible body member to the retracted position such that cord is compressed within the cavity of the flexible body member.

The flexible body member may include a material configured as a tubular accordion structure. The flexible body member may include a material configured as a tubular helical structure. The stationary clasp may be integrally formed with the flexible body member.

The stationary clasp, when coupled to the first end portion of the cord, may be configured to support a majority of a weight of the flexible body member.

The stationary clasp may be a tubular structure having a cavity with a diameter equal to or less than a diameter of the second end portion of the cord.

The flexible body member's collapsed length compared to the flexible body member's elongated length may be at least a ratio of 5:1.

The slidable clasp may include a structure having a slit being configured to have a closed position and an open position. The open position of the slit may create an opening in the structure to permit the slidable clasp to move the flexible body member over the cord. The closed position of the slit may permit the structure to grasp the second end portion of the cord.

The structure may further define an opening separate from the slit, where the opening may be configured to receive the first end portion of the cord. The slidable clasp may be a separate component from the flexible body member.

According to another embodiment, an apparatus us for managing a cord may include a flexible body member including a cavity extending along a length of the flexible body member. The flexible body member may be configured to receive and protect a cord within the cavity. The flexible body member may be configured to expand from a retracted position to an expanded position. The flexible body member may be biased towards the retracted position. The apparatus may include a stationary clasp integrally formed to a first end portion of the flexible body member, and the stationary clasp may be configured to be coupled to a first end portion of cord. The apparatus may include a slidable clasp disposed proximate to a second end portion of the flexible body, and the slidable clasp may be configured to move the flexible body member between the retracted position and the expanded position. The slidable clasp may be configured to be coupled to a second end portion of the cord. The stationary clasp may include a tubular structure having a cavity with a diameter equal to or less than a diameter of the second end portion of the cord.

When coupled to the second end portion cord, the slidable clasp may be configured to the move the flexible body member to the retracted position such that cord is compressed within the cavity of the flexible body member.

The flexible body member may include a material configured as a tubular accordion structure. The flexible body member's collapsed length compared to the flexible body member's elongated length may be at least a ratio of 5:1 and may be greater. The stationary clasp, when coupled to the first end portion of the cord, may be configured to support a majority of a weight of the flexible body member. The tubular structure of the stationary clasp may define a groove along a length of the stationary clasp.

The slidable clasp may include a structure having a slit being configured to have a closed position and an open position. The open position of the slit may create an opening in the structure to permit the slidable clasp to move the flexible body member over the cord. The closed position of the slit may permit the structure to grasp the second end portion of the cord.

The structure of the slidable clasp may further define an opening separate from the slit, where the opening may be configured to receive the first end portion of the cord.

The embodiments may provide a method of managing a cord. The method may include inserting a cord into a cord management system. The cord management system may include a stationary clasp, a flexible body member, and a slidable clasp. The method may further include coupling a first end portion of the cord to the stationary clasp, moving the slidable clasp towards a second end portion of the cord, thereby expanding the flexible body member over substantially all of the cord, coupling the slidable clasp to the second end portion of the cord, and moving the slidable clasp towards the first end portion of the cord, thereby retracting the flexible body member such that such that cord is compressed within the flexible body member.

The method may further include decoupling the slidable clasp to the second end portion of the cord, moving the slidable clasp towards the first end portion of the cord including retracting the flexible body member such that the cord is expanded to an elongated state, and coupling the slidable clasp to the first end portion of the cord including compressing the flexible body member to a compressed state.

BRIEF DESCRIPTION OF THE DRAWINGS

FIG. 3 illustrates a slidable clasp according to an embodiment;

FIG. 4 illustrates a slidable clasp according to another embodiment;

FIG. 5A shows a slidable clasp securely gripping the cord of earphones according to an embodiment;

FIG. 5B shows the slidable clasp releasing the grip of the slidable clasp slit by compression of the slidable clasp according to an embodiment;

FIG. 6 illustrates a cross-section view of a slidable clasp design having an activated closing mechanism according to an embodiment;

FIG. 16 illustrates a flowchart depicting example operations of the cord management system of any of the previous figures.

DETAILED DESCRIPTION

Figure 1A:
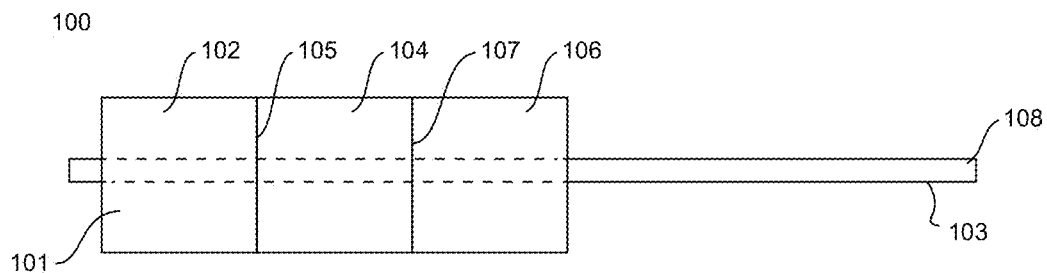
FIG. 1A illustrates an example of the cord management system according to an embodiment.

The embodiments provide methods, systems, and devices for storing and protecting cords in an organized and untangled state. For example, the embodiments may provide a portable cord management system and device for storing cords in an organized and untangled state. In some embodiments, the portable cord management system may include a slidable clasp, flexible body member, and stationary clasp. The assembled portable cord management system can be retrofitted onto to a user's pre-existing cords to provide an integrated means of storage for the cord when the cord is not in use.

In some embodiments, the assembled portable cord management system may include three main components such as a stationary clasp, a flexible body member, and a slidable clasp. The stationary clasp, which may connect to one end of the flexible body member, resides on one end of the cord and provides an anchoring point for the flexible body member and the slidable clasp. The flexible body member may stretch over the length of the cord, encapsulating it internally and provides a compacted storage cavity for the cord. The slidable clasp may be attached to the end of the elastic body member, opposite of the stationary clasp. The slidable clasp may provide a method to secure the cord internally to the flexible body member and may provide an anchoring point along the cord's length so that the flexible body member can compress the cord within the cavity of the flexible body member.

The assembled portable cord management system may reside on one end of the cord when the cord is in use allowing regular use of the cord. The assembled portable cord management system may encapsulate the cord when the opened slidable clasp and the flexible body member units are stretched over the cord while the closed stationary clasp remains at one end of the cord. After the flexible body member and slidable clasp are stretched over the length of the cord the slidable clasp is closed, gripping the cord, at which time the user allows the flexible body member to contract; in doing so the cord is contracted internally to the flexible body member and stowed in an untangled state. This method of cord encapsulation is provided by a two handed, one single motion that is simple and quick for the user to store their cord.

The assembled portable cord management system can be retrofitted onto pre-existing cords, such as a user's previously acquired wired headphone set or mobile electronic accessory cord. One embodiment of this design utilizes an applicator device to aid the user in affixing the device onto their cord. The applicator device in one embodiment expands the stationary clasp and slidable clasp allowing the user's cord to be threaded through the assembled device.

One embodiment of the slidable clasp design utilizes an activated closing mechanism. The activated closing mechanism in one embodiment is implemented by the natural rigidity of the material. In a separate embodiment the activated closing mechanism is implemented by a second resilient material that closes the clasp opening. Another embodiment of the slidable clasp design is comprised of a resilient, naturally closed, tubular chamber that when compressed forms an opening through the tubular chamber. The opening of the tubular chamber allows the cord to pass there through. When the resilient sidewalk of the slidable clasp are in the natural, uncompressed state, the tubular chamber closes around the cord forming a secure clasp to hold the cord in the user's desired position. Compression of the slidable clasp may be provided by the user's thumb and forefinger.

In some embodiments, the device utilizes a stationary clasp including a resilient tubular chamber with a smaller inner diameter of the cord's outer diameter. The small inner diameter of the resilient tubular chamber provides an interference fit around the cord's outer diameter. This interference fit provides a high friction coupling of the two pieces which immobilizes the stationary clasp along the cord's length. Affixing the stationary clasp to the cord in such a manner provides an anchoring point for the elastic body and slidable clasp to contract and store the cord internally to the elastic body. In other embodiments, the stationary clasp includes a hinged or two piece clasps that anchors one end of the flexible body member to the end the cord.

In other embodiments, the stationary clasp includes a lengthwise object with a lengthwise sinusoidal groove and a depth-wise V shaped groove that provides a means of anchoring the elastic body to the end of the cord. In other embodiments, the stationary clasp may include a cylindrical, helically wound braid that when compressed along its lengthwise axis expands radially allowing the user to thread cord through the clasp, when compressed radially and allowed to expand lengthwise this stationary clasp embodiment contracts around the cord and provides a means of anchoring the elastic body to the end of the cord.

One embodiment of the flexible body member design utilizes a helical-cylinder shape that decreases the length of the assembled portable cord management system while maintaining the overall elastic material length required to stretch over the length of the cord. Another embodiment of the flexible body member design utilizes a bellows shaped body that decreases the length of the assembled portable cord management system while maintaining the overall elastic material length required to stretch over the length of the cord.

In some embodiments, the cord management system may include the stationary clasp, the flexible body member, and the slidable clasp which may be individually manufactured components that when assembled create the device. In some other embodiments, the device may include the stationary clasp, the flexible body member, and the slidable clasp being manufactured as one continuous piece of the same material or rigid pieces molded into the continuous piece. These and other features of the embodiments are further explained with reference to the following figures.

Figure 1B:
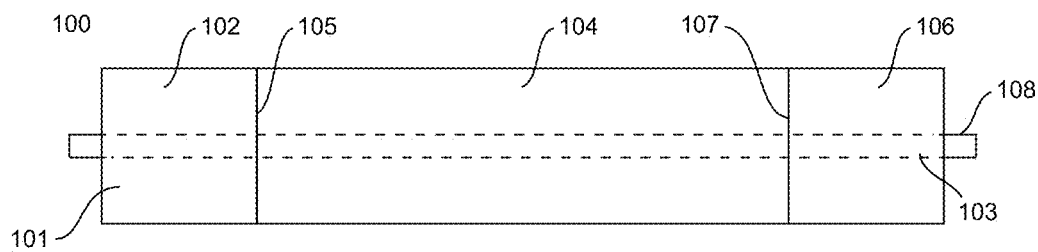
FIG. 1B illustrates the cord management system according another embodiment.
Figure 1C:
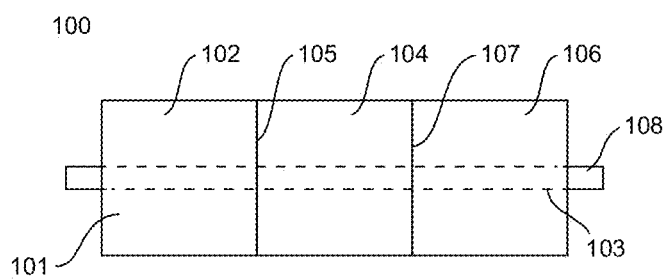
FIG. 1C illustrates the cord management system according to another embodiment.

FIGS. 1A-1C illustrates various configurations of a cord management system 100 according to embodiments. Referring to FIGS. 1A-1C, the cord management en system 100 may include a stationary clasp 102, a flexible body member 104, and a slidable clasp 106. Each of the stationary clasp 102, the flexible body member 104, and the slidable clasp 106 may define a cavity (or interior cavity) that permits a cord 108 to be inserted through the cord management system 100. Generally, the cord management system 100 may be configured to house and protect a cord 108, as well as store the cord 108 in a compressed state in a manner that does not permit the cord 108 to be tangled. Further, the cord management system 100 may be configured to compress the cord 108 while the cord 108 is being stored in the cord management system 100 such that the cord 108 does not become tangled when later used by a user. Generally, the cord 108 may be any type of flexible elongated material (e.g., rope, protected electrical cord, cable etc.) In some embodiments, the cord 108 may be any type of USB cord capable of connecting to a computer, a portable ear-phones device having a cord capable of connecting to a device, or generally any type of cord used to provide a connection to another device.

The flexible body member 104 may include any type of material having a structure that is capable of expanding and retracting, in one embodiment, the flexible body member 104 may be composed of a material having a structure configured as a tubular accordion structure. In other embodiments, the flexible body member 104 may be composed of a material having a structure configured as a tubular helical structure. Generally, the flexible body member 104 may stretch over the length of the cord 108, encapsulating it internally and provides a compacted storage cavity for the cord 108.

In some embodiments, flexible body member 104 may include a structure having a helical-cylinder shape that decreases the length of the cord management system 100 while maintaining the overall elastic material length required to stretch over the length of the cord 108. In other embodiments, the flexible body member 104 may include a structure having a bellows shaped body that decreases the length of the cord management system 100 while maintaining the overall elastic material length required to stretch over the length of the cord 108.

The stationary clasp 102 may be disposed proximate to a first end portion 105 of the flexible body member 104, and may be configured to be coupled to a first end portion 101 of the cord 108. In one embodiment, the stationary clasp 102 may be integrally formed with the flexible body member 104. For example, the stationary clasp 102 may be considered an extension of the flexible body member 104 having a tubular structure with a cavity where the cavity includes a diameter equal to or less than the first end portion 101 of the cord 108. In other embodiments, the stationary clasp 102 may be a component separate from the flexible body member 104, and be coupled to the flexible body member 104 based on an interference fit or coupled using any type of technique that joins two materials together.

In some embodiments, the stationary clasp 102 may include a resilient tubular chamber with a smaller inner diameter of the cord's outer diameter. The small inner diameter of the resilient tubular chamber provides an interference fit around the cord's outer diameter. This interference fit provides a high friction coupling of the two pieces which immobilizes the stationary clasp 102 along the cord's length. Affixing the stationary clasp 102 to the first end portion 101 of the cord 108 in such a manner provides an anchoring point for the elastic body and the slidable clasp 106 to contract and store the cord 108 internally to the flexible body member 104. In other embodiments, the stationary clasp 102 includes a hinged or two piece clasp that anchors one end of the flexible body member 104 to the first end portion 101 of the cord 108. In other embodiments, the stationary clasp 102 includes a lengthwise object with a lengthwise sinusoidal groove and a depth-wise V shaped groove that provides a means of anchoring the flexible body member 104 to the first end portion 101 of the cord 108. In other embodiments, the stationary clasp 102 may include a cylindrical, helically wound braid that when compressed along its lengthwise axis expands radially allowing the user to thread the cord 108 through the stationary clasp 102, when compressed radially and allowed to expand lengthwise this stationary clasp embodiment contracts around the cord and provides a means of anchoring the elastic body to the end of the cord.

The slidable clasp 106 may be disposed proximate to a second end portion 107 of the flexible body member 104. In one embodiment, the slidable clasp 106 may be a separate component from the flexible body member 104, and may be coupled to the flexible body member 104 based on an interference fit. In other embodiments, the slidable clasp 106 may be integrally formed with the second end portion 107 of the flexible body member 104. In some embodiments, the slidable clasp 106 may be configured to be coupled to a second end portion 103 of the cord 108. The slidable clasp 106 may be configured to move the flexible body member 104 between a retracted position and an expanded position.

In one embodiment, the slidable clasp 106 may include a structure having a slit that is configured to have a closed position and an open position. The open position of the slit may create an opening in the structure to permit the slidable clasp 106 to move the flexible body member 104 over the cord 108. The closed position of the slit may permit the structure of the slidable clasp 106 to grasp the second end portion 103 of the cord 108. Still further, the structure of the slidable clasp 106 may define an opening separate from the slit, where this opening is configured to receive the first end portion 101 of the cord 108.

In some embodiments, the slidable clasp 106 may provide a method to secure the cord 108 internally to the flexible body member 104 and may provide an anchoring point along the cord's length so that the flexible body member can compress the cord 108 within the cavity of the flexible body member 104.

In some embodiments, the slidable clasp 106 may include an activated closing mechanism. The closing mechanism activation in one embodiment is implemented by the natural rigidity of the material of the slidable clasp 106 itself. In a separate embodiment, the activated closing mechanism is implemented by a second resilient material that closes the slidable clasp's opening. In another embodiment, the slidable clasp 106 may include a resilient, naturally closed, tubular chamber that when compressed forms an opening through the tubular chamber. The opening of the tubular chamber allows the cord 108 to pass there through. When the resilient sidewalk of the slidable clasp 106 are in the natural, uncompressed state, the tubular chamber closes around the cord 108 forming a secure clasp to hold the cord 108 in the user's desired position. Compression of the slidable clasp 106 may be provided by the user's thumb and forefinger.

Figure 2A:
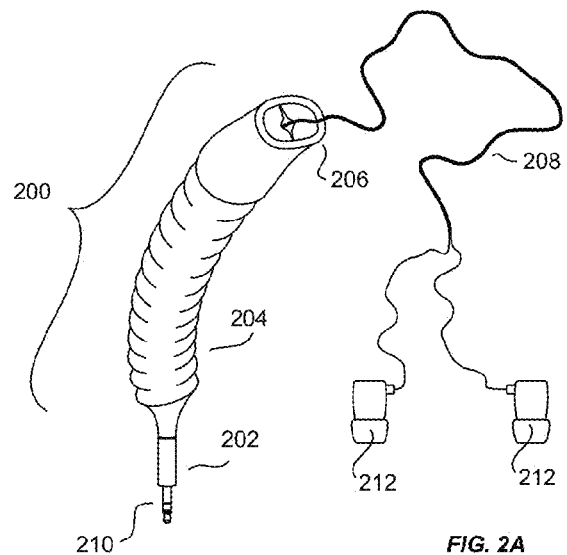
FIG. 2A illustrates the cord management system that is disposed on an end portion of the cord according to an embodiment.

FIG. 2A illustrates an example of the cord management system 100 according to an embodiment. In one embodiment, the cord management system 100 may be configured to receive the cord 108, and then position the cord management system 100 in a manner that the stationary clasp 102 is coupled to the first end portion 101 of the cord 108. In this state, the cord management system 100 may be a compressed state such that the cord management system 100 is disposed towards one end of the cord 108. In this context, the stationary clasp 102 is configured to grasp the first end portion 101 of the cord 108.

FIG. 1B illustrates the cord management system 100 according another embodiment. Referring to FIG. 19, the slidable clasp 106 may be configured to move towards the second end portion 103 of the cord, thereby expanding the flexible body member 104 to encompass most of the cord 108. Then, the slidable clasp 106 may be configured to be coupled to the second end portion 103 of the cord 108.

FIG. 1C illustrates the cord management system 100 according to another embodiment. Referring to FIG. 1C, the slidable clasp 106 may be moved towards the first end portion 101 of the cord 108, thereby retracting the flexible body member 104 to the retracted state. As a result, the cord 108 (disposed within the cavity of the flexible body member 104) is compressed.

Figure 2B:
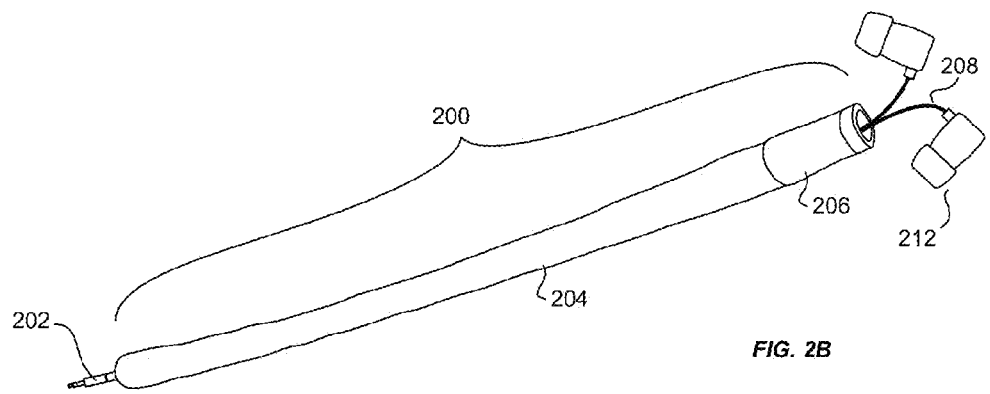
FIG. 2B illustrates the flexible body member stretched over the length of the cord encapsulating internally to the cord management system according to an embodiment.
Figure 2C:
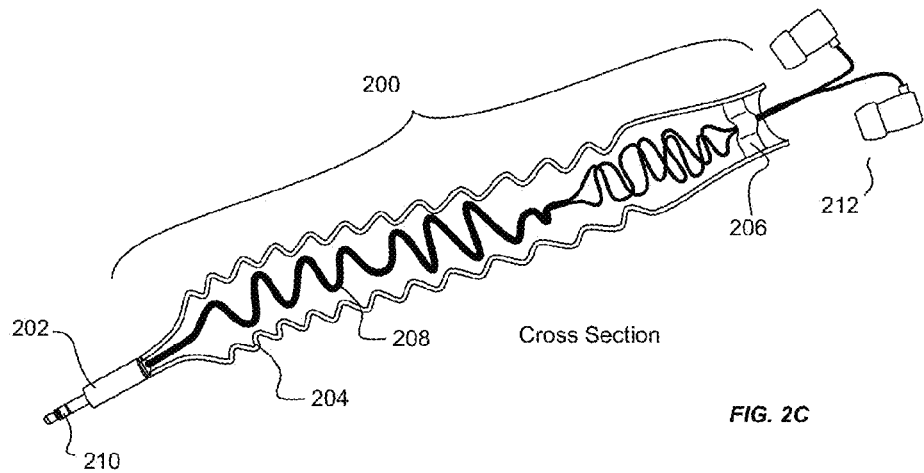
FIG. 2C illustrates a cut-away view of the cord management system storing the length of the cord internally to the flexible body member according to an embodiment.

FIGS. 2A-2C illustrate a cord management system 200 in a context of a wire ear-bud assembly having an audio/phono jack 210, ear buds 212, and a cord 208 connecting the audio/phono jack 210 with the ear buds 212. The audio/phono jack 210 may be coupled to another device such that the wired ear-bud assembly may transfer audio information to the user via the ear buds 212.

FIG. 2A illustrates the cord management system 200 that is disposed on an end portion of the cord 208 according to an embodiment. For example, the cord management system 200 may illustrate the cord management system 200 coupled to the cord 208 so that the user can use the wired ear-bud assembly (e.g., while running, etc.). As further explained below, the configuration of the cord management system 200 allows the cord management system 200 to be disposed on the cord 208 (thus ready to be used as a storage device) in a manner that does not place significant weight on the cord 208 itself. As a result, the placement of the cord management system 200 on the cord 208 while the user is actively using the device (e.g., has the ear buds 212 within his/her ears) does not interfere with the user's activities (e.g., it does not pull the ear buds 212 of the user) because its design allows a majority of the weight to be supported by the end of the cord, e.g., the end associated with the audio/phono jack 210.

Referring to FIG. 2A, in this embodiment, the assembled portable cord management system 200 includes a stationary clasp 202, a flexible body member 204, and a slidable clasp 206. The stationary clasp 202, which connects to one end of the flexible body member 204, resides on one end of the cord 208 and provides an anchoring point for the flexible body member 204 and the slidable clasp 206. The slidable clasp 206 is attached to the end of the flexible body member 204, opposite of the stationary clasp 202. The slidable clasp 206 provides a method to secure the cord internally to the flexible body member 204 and provides an anchoring point along the cord's length so that the flexible body member 204 can contract the cord 208 within the same. In this configuration shown in FIG. 2A the slidable clasp 206 is providing an anchoring point along the cord's length to maintain the flexible body member 204 in the collapsed state at the end of the cord 208. The assembled cord management system 200 resides on one end of the cord 208 such as an audio/phono jack 210 cord end of a wired earbud assembly, when the cord 208 is in use allowing regular use of the cord 208.

FIG. 2B illustrates the flexible body member 204 stretched over the length of the cord 208, encapsulating it internally to the cord management system 200 according to an embodiment. For example, the cord management system 200 may illustrate the cord management system 200 encapsulating the cord 208 for stowage. As further explained below, the configuration of the cord management system 200 allows user to encapsulate the length of the cord 208 by utilizing the stationary clasp 202 as an anchor mechanism and using the slidable clasp 206 to stretch the flexible body member 204 over the length of the cord 208. The user may hold the stationary clasp 202 in one hand while in the user's other hand the slidable clasp 206 is used to stretch the flexible body member 204 over the length of the cord 208.

FIG. 2C illustrates a cut-away view of the cord management system 200 storing the length of the cord 208, internally to the flexible body member 204. The flexible body member 204 has been allowed by the user to retract to the un-stretched length of the flexible body member 204. The cord 208 may be held lengthwise by the stationary clasp 202 and the slidable clasp 206 causing the cord 208 to retract internally to the flexible body member 204. The retracted length of the cord 208 is convenient for the user and stores the cord 208 and earphones system in an untangled state. The cord 208 may be held in this retracted state by the slidable clasp 206 and the stationary clasp 202.

FIG. 3 illustrates a slidable clasp 306 according to an embodiment. For example, the slidable clasp 306 may include a resilient tubular structure creating a tubular cavity with a tubular closure 319 at one axial end and a circular opening 318 on the other axial end of the tubular structure. The closure of the tubular body cavity, tubular closure 319, includes a structure having a slit 308 that is radial to the axis of the tubular closure and is configured to have an open and closed position. The slidable clasp circular opening structure 318 provides a circular structure to maintain an opening at one end of the slidable clasp 306. The slidable clasp tubular all 316 provides a connection between the circular opening structure 318 and the slit 308. The slidable clasp tabular wall 316 provides the main body structure of the slidable clasp 306. The slidable clasp, tubular closure 319 is comprised of the slit 308 with slit support structure 310 to create the slit 308 structure that may deform to an open position when compressed or maintain a closed position when not compressed.

The slit 308 is of a length that when the tubular wall 316 and slit support structure 310 are compressed forms an opening in similar portions of the diameter of the tubular structure wall 316. The circular opening structure 318 provides rigidity to the tubular structure to not deform when the slit support structure 310 and tubular wall 316 are compressed thereby providing a means to pass an object axially through the tubular structure only during deformation of the tubular wall 316 and slit support structure 310. The slit support structure 310 is joined with an extension tab 320 that allows the formation of a cord-end clasp 314. The extension tab 320 may form an opening that receives a portion of the cord. The cord-end clasp 314 may be circular in shape and allows a cord-end to be held stationary by the slidable clasp 306. The cord-end clasp 314 may be used in applications such as securing an earphones phono-jack to the slidable clasp 306.

FIG. 4 illustrates a slidable clasp 406 according to another embodiment. For example, FIG. 4 shows a slidable clasp 406 in one embodiment comprised of a tubular structure creating a tubular cavity with a tabular closure 419 at one axial end and a circular opening 418 on the other axial end of the tubular structure. The closure of the tubular body cavity, tubular closure 419, includes a structure having a slit 408 that is radial to the axis of the tubular closure and is configured to have open and closed position. The slidable clasp circular opening structure 418 provides a circular structure to maintain an opening at one end of the slidable clasp 406. The slidable clasp tubular wall 416 provides a connection between the circular opening structure 418 and the slit 408. The slidable clasp tubular wall 416 provides the main body structure of the slidable clasp 406. The slidable clasp tubular closure 419 is comprised of the slit 408 with slit support structure 410 to create the slit 408 structure that may deform to an open position when compressed or maintain a closed position when not compressed.

The slidable clasp slit 408 is of a length that when the tubular wall 416 and slit support structure 410 are compressed forms an opening in similar portions of the diameter of the tubular structure wall 416. The circular opening structure 418 provides rigidity to the tubular structure to not deform when the slit support structure 410 and tubular wall 416 are compressed thereby providing a means to pass an object axially through the tubular structure only during deformation of the tubular wall 416 and slit support structure 410.

Referring to both FIGS. 3 and 4 the slidable clasp 306 and 406 may be manufactured of natural latex blends, silicone compound blends, or soft plastics. The slidable clasps 306 and 406 may be manufactured as an integral component of the flexible body member or as an individual component and coupled to the flexible body member using any type of technique that joins two materials together.

FIG. 5A shows a slidable clasp 506 securely gripping the cord of earphones 512 according to an embodiment. When the resilient sidewalls of the slidable clasp 506 are in the natural, uncompressed state, the slidable clasp slit 508 engages around the cord forming a secure hold to the cord in the user's desired cord position.

FIG. 5B shows the slidable clasp 508 releasing the grip of the slidable clasp slit 511 by compression of the slidable clasp 508 according to an embodiment. The compression of the slidable clasp 508 is provided by the user's thumb and forefinger. The released grip of the slidable clasp 508 on the cord allows the cord to pass therein as desired by the user.

FIG. 6 illustrates a cross-section view of a slidable clasp design 606 having an activated closing mechanism according to an embodiment. The activated closing mechanism 608 in one embodiment is implemented by the natural rigidity of the material. The slidable clasp jaw 622 is opened by squeezing the slidable clasp 606 about the cylindrical fulcrum 620. The slidable clasp embodiment of 606 may be manufactured from materials such as natural latex, silicon compounds, or soft, resilient plastic. The cylindrical fulcrum 620 may be manufactured from materials such as a hard plastic material that may not deform when the activated closing mechanism 608 is compressed. The activated closing mechanism 608 may be manufactured of natural latex blends, silicon compound blends, or soft plastics. The slidable clasp design 606 may be manufactured independently and bonded to the flexible body member or of the same construction as the flexible body member.

The flexible body member physical design and material selection is a key component of the viability of the cord management system. The physical shape of the flexible body member may be capable of stretching to the user's cord length while simultaneously reducing to a collapsible length that may conveniently reside at the end of the user's cord. The flexible body member encapsulates and secures the cord internally to a compacted length that is convenient and manageable for the user while also protecting the cord and keeping the cord from entanglement.

Several embodiments of the flexible body member are realized including shapes that are helical in design, embodiment 804; shapes that similar to an accordion with bellows convulates, embodiment 704; and elastic body shapes that are similar to space antennas that are foldable cylinders, embodiment 904.

The flexible body member's material design selection is based on the non-elongated length desired (as when the cord is in use by the user) which should be minimal for the user's convenience and the elongated length that is required to stretch over the user's cord. This ratio of elongated/non-elongated in one embodiment specific to wired earphone assemblies, which have a nominal length of 140 cm and the non-elongated length of 10 cm, is found to be 14:1. Materials that can expand and contract without yielding to ratios of at least 10:1 are limited to natural latex blends, although some silicone blends may be considered if physical design shape of the flexible body member can be manipulated to account for the remaining elongated/non-elongated ratio not met by the material. Silicone blends can be realized with expansion to contraction ratios of 2:1 to 5:1 and even higher. Natural latex blends can be realized with expansion to contraction ratios of 4:1 to 10:1. Several embodiments of the flexible body member utilize both material selection and flexible body member design to achieve the overall elongated/non-elongated ratio of 14:1. The radial shape of the flexible body member shown in the depicted embodiments is shown as circular in shape although in some embodiments this radial shape may utilize different shapes other than circular. The radial shape of some embodiments of the flexible body member may be triangular, square, rectangular or of other shapes.

Figure 7:
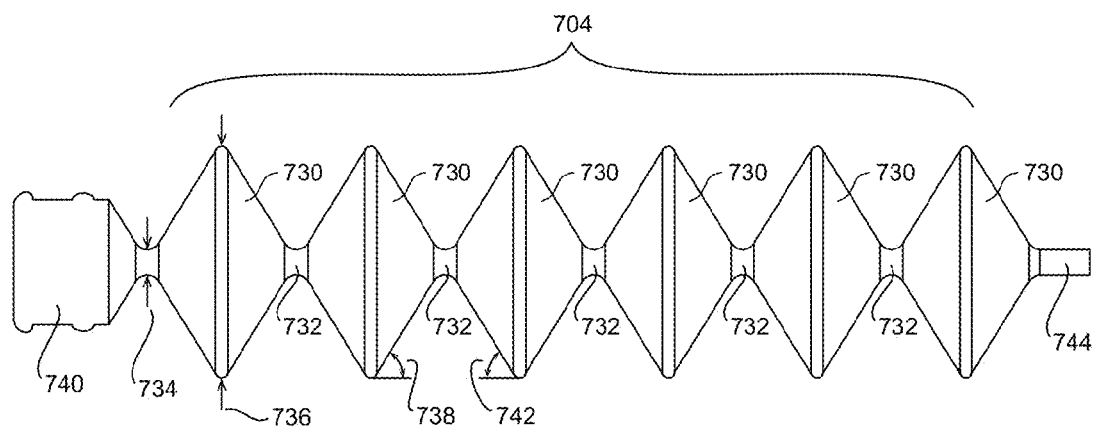
FIG. 7 illustrates a flexible body member having an accordion structure according to an embodiment.

FIG. 7 illustrates a flexible body member 704 having an accordion structure according to an embodiment.

Referring to FIG. 7, a flexible body member 704 design utilizes a tubular bellows shaped body, similar to a tubular accordion structure, with multiple tubular bellows structures 730 comprising the length of the flexible body member 704. The tubular bellows structures 730 are formed between the inner bellows diameter 734 and the outer bellows diameter 736. The bellows structures 730 are also formed by a right bellows pitch angle 738 and a left bellows pitch angle 742. The tubular bellows structures 730 embodiments may vary in shape such as varying the pitch angle of the inner to outer diameters by changing the right and left bellows pitch angles 738 and 742 respectively. In varying right and left bellows pitch angles 738 and 742 the ability of the conjoined bellows structures 730 to elongate into a longer axial length may be increased, thus increasing the elongated/non-elongated ratio of the flexible tubular member 704. The bellows structures are axially joined to each other using a bellows inner joint 732. The diameter of the bellows inner joint 732 is of such a diameter that allows a cord to pass therein and may vary with embodiments. The multiple bellows structure s730 when joined axially in multiplicity creates a cavity that can be axially elongated or collapsed over the length of a cord. In the axially collapsed state the tubular bellows structures 730 collapse upon themselves decreasing the overall length of the flexible body member 704. In the axially elongated state the tubular bellows structures 730 elongate to form a length that additionally comprises a component of radial diameter 736 which acts to increase the axial length of the flexible body member 704. The ratio of axially elongated to axially non-elongated states of the flexible tubular structure 704 may increase the convenience of the device to the user.

In some embodiments the flexible body member 704 includes an integral slidable clasp interface 740. The integral slidable clasp interface 740 is a structure that allows the joining of the flexible body member to the slidable clasp component along the axial length of the flexible body member 704. In some embodiments the flexible body member 704 includes an integral stationary clasp interface 744. The integral stationary clasp interface 744 is a structure that allows the joining of the flexible body member to the stationary clasp component along the axial length of the flexible body member 704.

Figure 8:
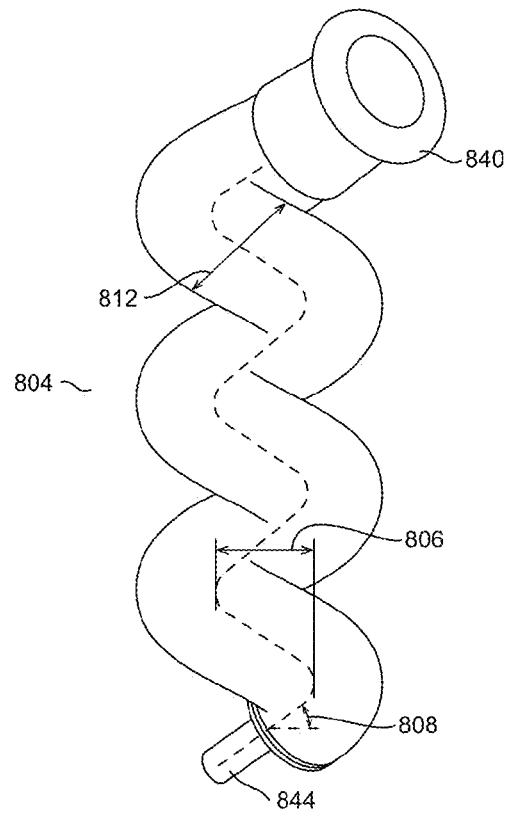
FIG. 8 illustrates a flexible body member having a tubular helical shape according to an embodiment.

FIG. 8 illustrates a flexible body member 804 having a tubular helical shape according to an embodiment.

Referring to FIG. 8, in some embodiments, the flexible body member 804 design utilizes a tubular helical shape that decreases the collapsed length of the cord management system while maintaining the overall material length required to stretch over the length of the cord. A helical diameter of the tubular shape is given by a dimension helical diameter 806 which defines the radial diameter of the helical shape. A helical pitch angle of the helical shape is given by the dimension helical pitch angle 808 which varies the number of turns of the helix per axial length of the helix. The tubular bellows structures 804 embodiments may vary in shape such as varying the helical diameter 806 and the helical pitch angle 808. The tubular diameter 812 may vary as well. In varying the tubular diameter 812, helical pitch angle 808, and helical diameter 806 the ability of the tubular helical shape 804 to collapse/compress into a smaller axial length may be increased. In some embodiments the flexible body member 804 includes an integral slidable clasp interface 840.

In some embodiments the flexible body member 804 includes an integral slidable clasp interface 840. The integral slidable clasp interface 840 is a structure that allows the joining of the flexible body member to the slidable clasp component along the axial length of the flexible body member 804. In some embodiments the flexible body member 804 includes an integral stationary clasp interface 844. The integral stationary clasp interface 844 is a structure that allows the joining of the flexible body member to the stationary clasp component along the axial length of the flexible body member 704. The flexible body member 804 may be manufactured of natural latex blends, silicone compound blends, or other material. The flexible body member 804 may be manufactured independently and bonded to the stationary clasp and the slidable clasp or be of the same construction/material as the stationary clasp and the slidable clasp.

Figure 9:
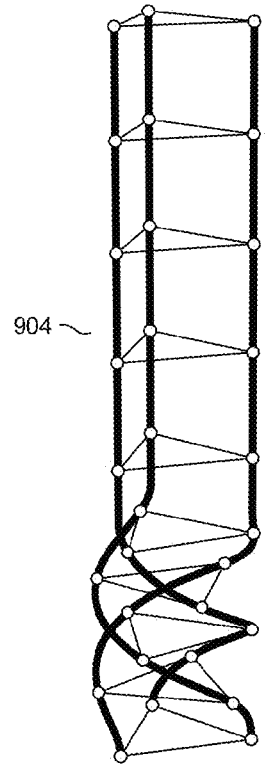
FIG. 9 illustrates a flexible body member having a folding cylinder shape according to an embodiment.

FIG. 9 illustrates a flexible body member 904 having a folding cylinder shape according to an embodiment. Referring to FIG. 9, in some embodiments, the flexible body member 904 design utilizes a folding cylinder shape similarly used in space antenna design that decreases the length of the assembled portable cord management system while maintaining the overall elastic material length required to stretch over the length of the cord.

The flexible body member embodiments 704, 804, and 904 may be manufactured of natural latex blends, silicone compound blends, or other material. The flexible body member embodiments 704, 804, and 904 may be manufactured independently and bonded to the stationary clasp and the slidable clasp or be of the same construction/material as the stationary clasp and the slidable clasp.

Figure 10A:
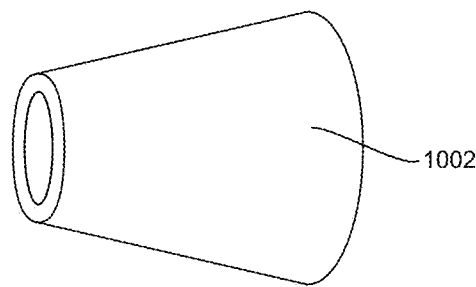
FIG. 10A illustrates a cord management system applicator device according to an embodiment.

FIG. 10A illustrates a cord management system applicator device according to an embodiment. Referring to FIG. 10A a cord management system applicator device 1002 embodiment is depicted. The cord management system applicator device 1002 may consist of conical shape that expands the cord management system allowing the user's cord to be threaded through the assembled cord management system.

Figure 10B:
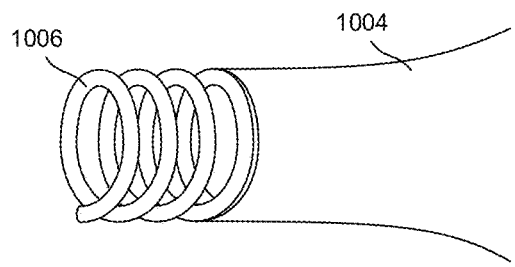
FIG. 10B illustrates the cord management system applicator device according to an embodiment.

FIG. 10B illustrates the cord management system applicator device according to an embodiment. Referring to FIG. 10B a cord management system applicator device 1006 embodiment is depicted. The cord management system applicator device 1006 may consist of helical shape that expands the cord management system allowing the user's cord to be threaded through the assembled cord management system.

The cord management system applicator device 1006 and 1002 of natural latex blends, silicone compound blends, or other material. In one embodiment the cord management system applicator device 1006 or 1002 may be pressed into the stationary clasp 1004 during the cord management system's manufacture or by the end user when retrofitting the cord management system onto a pre-existing cord.

The applicator device embodiments 1002 and 1006 may be temporarily used for the cord management system's initial installation onto the user's cord and may be discarded after use.

Figure 11:
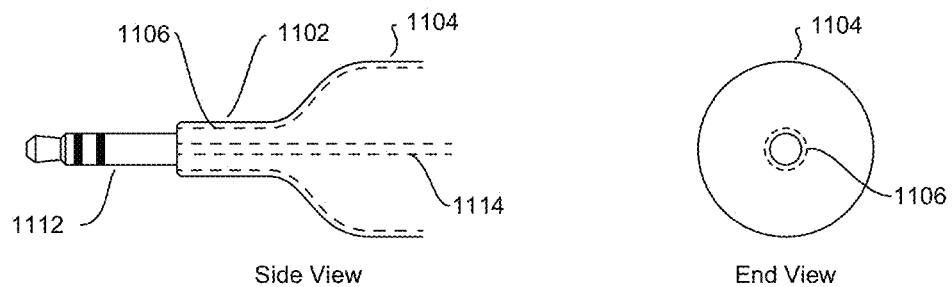
FIG. 11 illustrates a stationary clasp according to an embodiment.

FIG. 11 illustrates a stationary clasp according to an embodiment. Referring to FIG. 11, one embodiment of the design utilizes a stationary clasp 1102 comprised of a resilient tubular chamber 1106 with a smaller inner diameter of the cord's 1114 outer diameter. The small inner diameter of the resilient tubular chamber 1106 provides an interference fit around the cord's 1114 outer diameter. This interference fit provides a high friction coupling of the two pieces which immobilizes the stationary clasp 1102 along the cord's 1114 length. The stationary clasp 1102 may be fixed near the cord's 1114 audio-phono jack 1112 if the cord is equipped with such. Affixing the stationary clasp 1102 to the cord in such a manner provides an anchoring point for the flexible body member 1104 to contract and store the cord 1114 internally to the flexible body member 1104. The stationary clasp embodiment 1102 may be manufactured of natural latex blends, silicone compound blends, soft plastics, or other materials. The stationary clasp embodiment 1102 may be manufactured independently and coupled to the flexible body member 1104 using any type of technique that joins two materials together or of the same construction as the flexible body member 1104.

Figures 12A, 12B:
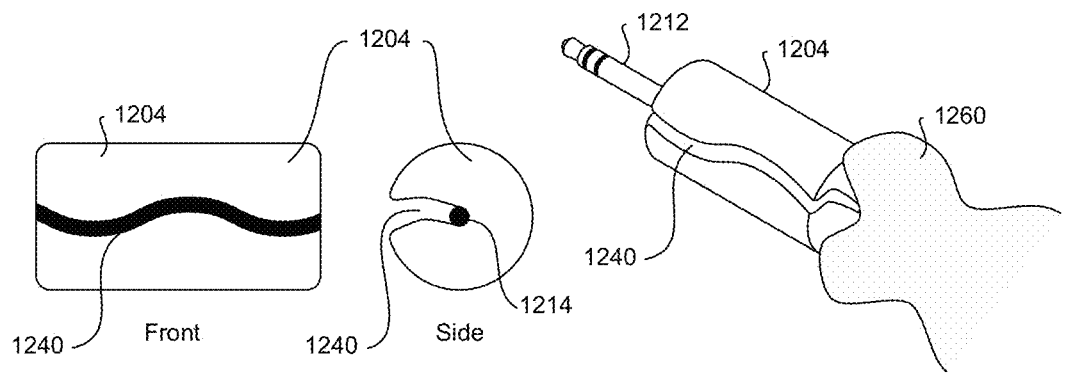
FIG. 12A illustrates the stationary clasp according to another embodiment.
FIG. 12B illustrates another perspective of the stationary clasp of FIG. 12A according to an embodiment.

FIG. 12A illustrates the stationary clasp according to another embodiment. FIG. 12B illustrates another perspective of the stationary clasp of FIG. 12A according to an embodiment. Referring to FIG. 12A, in some embodiments, the stationary clasp 1204 is comprised of a lengthwise object with a lengthwise sinusoidal and depth-wise V shaped groove 1240. The sinusoidal groove 1240 provides a means of anchoring the flexible body member 1260 to the end of the cord 1214. The stationary clasp 1204 may be fixed near the cord's 1214 audio-phono jack 1212 if the cord is equipped with such. The stationary clasp embodiment 1204 may be manufactured of natural latex blends, silicone compound blends, soft plastics, or other materials. The stationary clasp embodiment 1204 may be manufactured independently and coupled to the flexible body member 1260 using any type of technique that joins two materials together or of the same construction as the flexible body member 1104.

In some other embodiments, the stationary clasp is comprised of a cylindrical, helically wound braid that when compressed along its lengthwise axis expands radially allowing the user to thread cord through the clasp, when compressed radially and allowed to expand lengthwise this stationary clasp embodiment contracts around the cord and provides a means of anchoring the elastic body to the end of the cord. This embodiment is similar to a child's play toy known as a "Chinese finger-cuff."

Figures 13A, 13B:
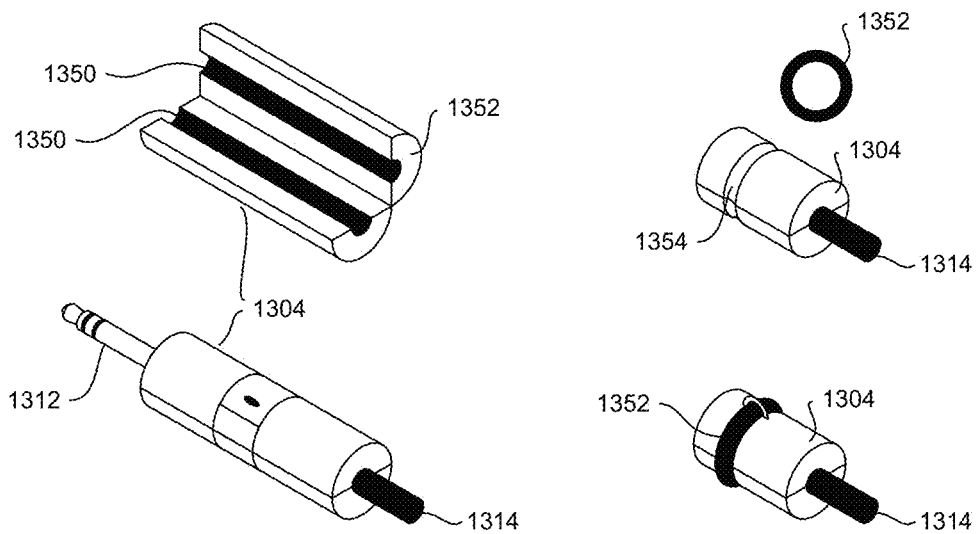
FIG. 13A illustrates a stationary clasp according to another embodiment.
FIG. 13B illustrates another perspective of the stationary clasp of FIG. 13A according to an embodiment.

FIG. 13A illustrates a stationary clasp according to another embodiment. FIG. 13B illustrates another perspective of the stationary clasp of FIG. 13A according to an embodiment. Referring to FIGS. 13A and 13B, in some other embodiments, the stationary clasp is comprised of a hinged or two piece clasp 1304 that may anchor one end of the flexible body member to the audio/phono jack 1312. The embodiment of FIG. 13A is a hinged or two piece embodiment with a cord groove 1350 to clamp to outer diameter of the cord 1314. The embodiment of FIG. 13B is a hinged or two piece embodiment with an O-ring 1352 securing the clasp closed around the cord 1314. The o-ring fits in the groove 1354 that is radial about the axial length of the stationary clasp 1304. The stationary clasp 1304 may also be fixed near the cord's 1314 audio-phono jack 1312 or other cord ends if the cord is equipped with such. The stationary clasp embodiment 1304 may be manufactured of natural latex blends, silicone compound blends, soft plastics, or other materials. The stationary clasp embodiment 1304 may be manufactured independently and coupled to the flexible body member using any type of technique that joins two materials together or of the same construction as the flexible body member.

Figure 14A:
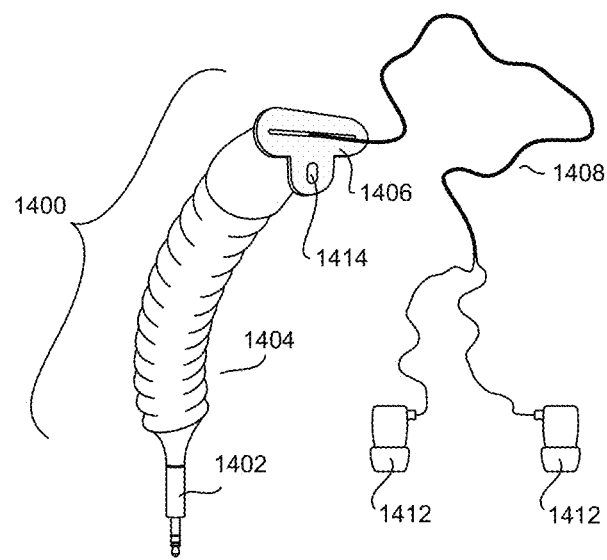
FIG. 14A illustrates a cord management system according to another embodiment.
Figure 14B:
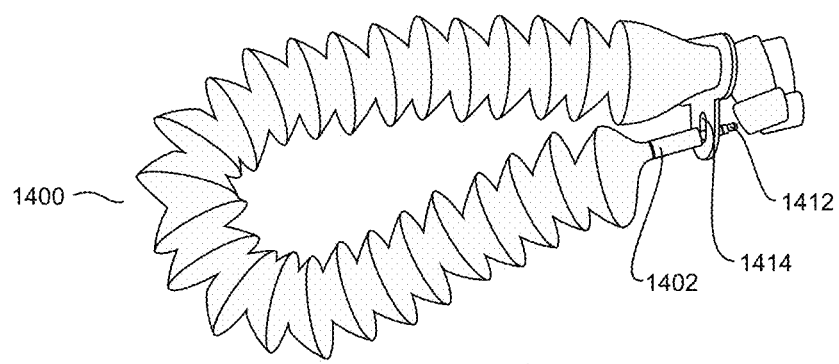
FIG. 14B illustrates another perspective of the cord management system of FIG. 14A according to an embodiment.

FIG. 14A illustrates a cord management system according to another embodiment. FIG. 14B illustrates another perspective of the cord management system of FIG. 14A according to an embodiment. Referring to FIG. 14A, the cord management system 1400 is depicted in a state with the earphones 1412 extended to be used by the riser. The cord management system 1400 is compacted at the phono-jack end of the cord providing the user normal usability of the earphones 1412. The cord management system 1400 is secured in the depicted compacted state by the slidable clasp slit 1406, shown gripping the earphone's cord, and the stationary clasp 1402. The flexible body member 1404 is compressed between the stationary clasp 1402 and the slidable clasp to a collapsible length that does not interfere with the user's normal operation of the earphones 1412. The cord-end clasp 1412 may or may not be engaged when the user is utilizing the earphones in their normal use.

Referring to FIG. 14B, the cord management system 1400 is depicted in a state with the earphones stored internally to the cord management system 1400. The phono-jack 1412 of the earphones is inserted into the cord-end clasp 1414 thereby decreasing the overall length of the cord management system to a secondary length more convenient to the user.

Figure 15:
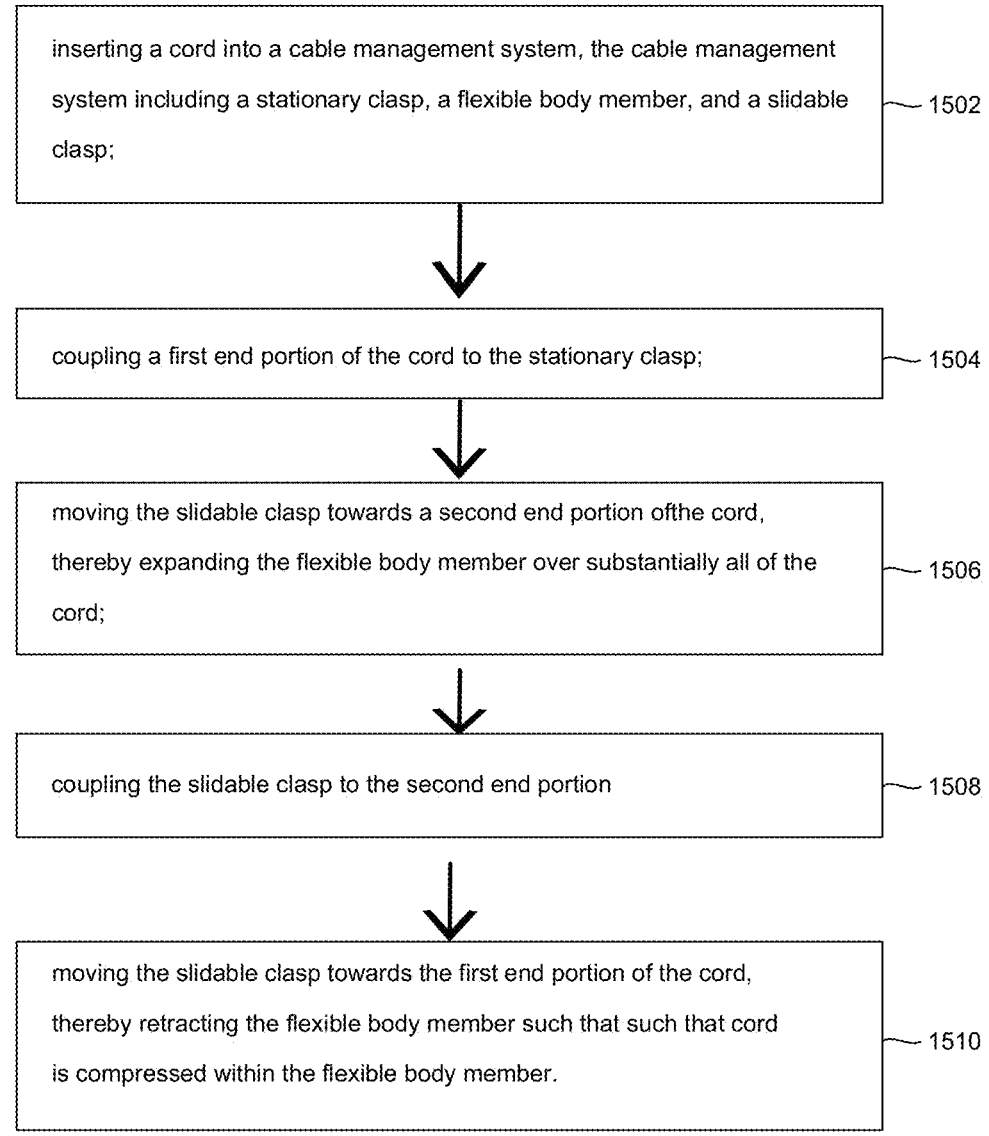
FIG. 15 illustrates a flowchart depicting example operations of the cord management system of any of the previous figures.

FIG. 15 illustrates a flowchart depicting example operations of the cord management system of any of the previous figures.

Inserting a cord into a cord management system, the cord management system including a stationary clasp, a flexible body member, and a slidable clasp (1502). The cord management system 100 array include the stationary clasp 102, the flexible body member 104, and the slidable clasp 106. However, these components may be any of the components described with reference to the previous figures, where the numeric identifiers 100, 102, 104, and 106 generally represent any of the previous embodiments. In one implementation, the user may insert the cord management system 100 over the cord 108.

Coupling a first end portion of the cord to the stationary clasp (1504). For example, a user may couple the first end portion 101 to the stationary clasp. Moving the slidable clasp towards a second end portion of the cord, thereby expanding the flexible body member over substantially all of the cord (1506). Coupling the slidable clasp to the second end portion of the cord (1508). Moving the slidable clasp towards the first end portion of the cord, thereby retracting the flexible body member such that said cord is compressed within the flexible body member (1510).

FIG. 16 illustrates a flowchart depicting example operations of the cord management system of any of the previous figures. The example operations of FIG. 16 may be a continuation of FIG. 15, or a method separate from the operations of FIG. 15.

Referring to FIG. 16 a method for retrieving a stored cord from the cord management system is depicted. Decoupling the slidable clasp from the second end portion of the cord (1602). Moving the slidable clasp towards the first end portion of the cord, thereby retracting the flexible body member such that said cord is expanded to its elongated state (1604). Coupling the slidable clasp to the first end portion of the cord thereby compressing the flexible body member to a compressed state (1606).

Other applications of the cord management system use may include but are not limited to storing cords associated with various portable electronic devices such as charging cords, USB interface cords, test probes/leads of electronic test equipment, ropes, cords, or lanyards that are of a length and diameter that could be encased.

What is claimed is:
1. An apparatus for managing a cord, the apparatus comprising:
  a flexible body member including a cavity extending along a length of the flexible body member, the flexible body member configured to receive and protect a cord within the cavity, the flexible body member configured to expand from a retracted position to an expanded position, the flexible body member being biased towards the retracted position;
a stationary clasp disposed proximate to a first end portion of the flexible body member, the stationary clasp configured to be coupled to a first end portion of cord; and
a slidable clasp disposed proximate to a second end portion of the flexible body, the slidable clasp configured to move the flexible body member between the retracted position and the expanded position, wherein the slidable clasp has an open position and a closed position, and is configured to serve as an anchor point along, a length of the cord, the slidable clasp having an elongated structure with a length greater than a diameter of the cavity, the elongated structure defining a slit extending along an axis orthogonal to a longitudinal axis of the flexible body member,
wherein, when coupled to the second end portion cord, the slidable clasp is configured to the move the flexible body member to the retracted position such that cord is compressed within the cavity of the flexible body member.

2. The apparatus of claim 1, wherein the flexible body member includes a material configured as a tubular accordion structure.

3. The apparatus of claim 1, wherein the flexible body member includes a material configured as a tubular helical structure.

4. The apparatus of claim 1, wherein the stationary clasp is integrally formed with the flexible body member.

5. The apparatus of claim 1, wherein the stationary clasp, when coupled to the first end portion of the cord, is configured to support a majority of a weight of the flexible body member.

6. The apparatus of claim 1, wherein the stationary clasp is a tubular structure having a cavity with a diameter equal to or less than a diameter of the second end portion of the cord.

7. The apparatus of claim 1, wherein the flexible body member's collapsed length compared to the flexible body member's elongated length is at least a ratio of 5:1.

8. The apparatus of claim 1, wherein the elongated structure of the slidable clasp defines a slit having the closed position and the open position, the open position of the slit creating an opening in the elongated structure to permit the slidable clasp to move the flexible body member over the cord, the closed position of the slit permitting the elongated structure to grasp the second end portion of the cord.

9. The apparatus of claim 8, wherein the elongated structure further defines an opening separate from the slit, the opening that is separate from the slit configured to receive the first end portion of the cord.

10. The apparatus of claim 1, wherein the slidable clasp is a separate component from the flexible body member.

11. An apparatus for managing a cord, the apparatus comprising:
a flexible body member including a cavity extending along a length of the flexible body member, the flexible body member configured to receive and protect a cord within the cavity, the flexible body member configured to expand from a retracted position to an expanded position, the flexible body member being biased towards the retracted position;
a stationary clasp integrally formed to a first end portion of the flexible body member, the stationary clasp configured to be coupled to a first end portion of cord; and
a slidable clasp disposed proximate to a second end portion of the flexible body, the slidable clasp configured to move the flexible body member between the retracted position and the expanded position, the slidable clasp is configured to be coupled to a second end portion of the cord, the slidable clasp having an elongated structure defining a slit the slit having a closed position and an open position, the open position of the slit creating an opening in the elongated structure to permit the slidable clasp to move the flexible body member over the cord, the closed position of the slit permitting the elongated structure to grasp the second end portion of the cord, the slidable clasp having an extension tab extending from the elongated structure, the extension tab defining, a hole configured to receive a portion of the cord,
wherein the stationary clasp includes a tubular structure having a cavity with a diameter equal to or less than a diameter of the second end portion of the cord.

12. The apparatus of claim 11, wherein, when coupled to the second end portion cord, the slidable clasp is configured to the move the flexible body member to the refracted position such that cord is compressed within the cavity of the flexible body member.

13. The apparatus of claim 11, wherein the flexible body member includes a material configured as a tubular accordion structure.

14. The apparatus of claim 11, wherein the flexible body member's collapsed length compared to the flexible body member's elongated length is at least a ratio of 5:1 and may be greater.

15. The apparatus of claim 11, wherein the stationary clasp, when coupled to the first end portion of the cord, is configured to support a majority of a weight of the flexible body member.

16. The apparatus of claim 11, wherein the flexible body member's collapsed length compared to the flexible body member's elongated Length is at least a ratio of 5:1.

17. The apparatus of claim 11, wherein the elongated structure of the slidable clasp has a length greater than a diameter of the cavity, the slit of the elongated structure extending along an axis orthogonal to a longitudinal axis of the flexible body member.

18. A method of managing a cord, the method comprising:
inserting a cord into a cord management system, the cord management system including a stationary clasp, a flexible body member defining a cavity, and a slidable clasp, wherein the slidable clasp has an open position and a closed position, and is configured to serve as an anchor point along a length of the cord, the slidable clasp having an elongated structure with a length greater than a diameter of the cavity, the elongated structure defining a slit extending along an axis orthogonal to a longitudinal axis of the flexible body member;
coupling a first end portion of the cord to the stationary clasp;
moving the slidable clasp towards a second end portion of the cord including expanding the flexible body member over substantially all of the cord;
coupling the slidable clasp to the second end portion of the cord; and
moving the slidable clasp towards the first end portion of the cord including retracting the flexible body member such that such that cord is compressed within the flexible body member.

19. The method of claim 18, further comprising:
decoupling the slidable clasp to the second end portion of the cord;
moving the slidable clasp towards the first end portion of the cord including retracting the flexible body member such that the cord is expanded to an elongated state; and coupling the slidable clasp to the first end portion of the cord including compressing the flexible body member to a compressed state.

* * * * *